US012436792B2

(12) United States Patent
Khan

(10) Patent No.: US 12,436,792 B2
(45) Date of Patent: Oct. 7, 2025

(54) ORCHESTRATION OF VIRTUALIZATION TECHNOLOGY AND APPLICATION IMPLEMENTATION

(71) Applicant: Telefonaktiebolaget LM Ericsson (publ), Stockholm (SE)

(72) Inventor: Shah Nawaz Khan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 580 days.

(21) Appl. No.: 17/914,204

(22) PCT Filed: Mar. 31, 2020

(86) PCT No.: PCT/EP2020/059147
§ 371 (c)(1),
(2) Date: Sep. 23, 2022

(87) PCT Pub. No.: WO2021/197588
PCT Pub. Date: Oct. 7, 2021

(65) Prior Publication Data
US 2023/0115707 A1 Apr. 13, 2023

(51) Int. Cl.
*G06F 9/455* (2018.01)
*G06F 9/50* (2006.01)
(52) U.S. Cl.
CPC ........ *G06F 9/45558* (2013.01); *G06F 9/5077* (2013.01); *G06F 2009/45595* (2013.01)
(58) Field of Classification Search
CPC .... G06F 3/0662; G06F 9/455; G06F 9/45504; G06F 9/46; G06F 9/466
See application file for complete search history.

(56) References Cited

U.S. PATENT DOCUMENTS 10,764,939 B2 * 9/2020 Liu .................. H04L 41/046
11,683,222 B2 * 6/2023 Li ................... H04L 41/5054
                                                     709/223
(Continued)

FOREIGN PATENT DOCUMENTS

WO   2017194990 A1   11/2017
WO   2018000240 A1    1/2018
WO   2018178033 A1   10/2018

OTHER PUBLICATIONS

International Search Report and Written Opinion of the International Searching Authority for PCT International Application No. PCT/EP2020/059147 dated Dec. 2, 2020.
(Continued)

*Primary Examiner* — Andy Ho
(74) *Attorney, Agent, or Firm* — Sage Patent Group

(57) ABSTRACT

A virtual network function application is to be deployed in a multi-technology virtualization environment. The multi-technology virtualization environment comprises a plurality of virtualization technologies. The application exists in a plurality of application implementations. At least one of the virtualization technologies has a preferred one of the application implementations. The deployment comprises receiving a trigger for a deployment of the virtual network function application. In response to the trigger, information is obtained about at least one optimization objective and about resource utilization in the multi-technology virtualization environment. Based on the received information, one of the plurality of virtualization technologies is selected for said deployment. One of the application implementations is also selected, and the selected application implementation need not be the preferred application implementation for the selected virtualization technology. The selected application implementation of the virtual network function application
(Continued)

is then deployed on the selected one of the virtualization technologies.

20 Claims, 13 Drawing Sheets

(56) References Cited

U.S. PATENT DOCUMENTS

| | | | |
|---|---|---|---|
| 11,695,568 B1* | 7/2023 | Kempf | H04L 9/3242 |
| | | | 713/176 |
| 12,265,843 B2* | 4/2025 | Lemoine | G06F 9/45558 |
| 2018/0309646 A1 | 10/2018 | Mustafiz et al. | |
| 2019/0042297 A1 | 2/2019 | Connor et al. | |

OTHER PUBLICATIONS

S. Han et al., "Service-aware Based Virtual Network Functions Deployment Scheme in Edge Computing," 22nd International Conference on Advanced Communications Technology (ICACT), Feb. 16, 2020, pp. 562-565.

Chappell, "Deploying Virtual Network Functions: The Complementary Roles of TOSCA & NETCONF/YANG", Heavy Reading White Paper, Feb. 1, 2015, 9 pages.

ETSI GS NFV-MAN 001 V1.1.1, "Network Functions Virtualisation (NFV); Management and Orchestration," Dec. 2014, 184 pages.

ETSI, "Standards for NFV—Network Functions Virtualisation—NFV Solutions," Mar. 2020, https://www.etsi.org/technologies/nfv, 41 pages.

F. Zhao et al., "Cognitive Radio Technology," Chapter 11: Network Support: The Radio Environment Map. 10.1016/B978-0-12-374535-4.00011-4, 2009, table of contents, 2 pages.

"Oasis Topology and Orchestration Specification for Cloud Applications (TOSCA) TC," 2020, 5 pages.

L. Fallon et al., "The ONAP Policy Framework," ONAP Developer Wiki—Confluence, Policy R4 Dublin Release Planning, Mar. 2019, 33 pages.

Y. Zhao et al., "Development of Radio Environment Map Enabled Case- and Knowledge-Based Learning Algorithms for IEEE 802.22 WRAN Cognitive Engines," 2007 2nd International Conference on Cognitive Radio Oriented Wireless Networks and Communications, 2007, pp. 44-49.

Y. Zhao et al., "Performance Evaluation of Radio Environment Map-Enabled Cognitive Spectrum-Sharing Networks," MILCOM 2007—IEEE Military Communications Conference, 2007, pp. 1-7.

* cited by examiner

Object-Type: VNF
APIVersion: v1
Action: Deploy
Specification:
    Vendor: Provider-A
    Location: Cloud-X
    Flavor: Medium-capacity

FIG. 8

```
tosca_definitions_versions: tosca_simple_yaml_1_0
description: VNF descriptor for service-X with multiple implementation designs
imports: toscaprofile-providerx.yaml
nodes_types: # specifies vnf components
    backend:
        derived_from: tosca.nodes.Database
        . . .
    frontend
        derived_from: tosca.nodes.Dashboard
        . . .
    datapipe:
        derived_from: com.providerx.Internal_link
        . . .
    initializer:
        derived_from: com.providerx.initializers
        . . .
artifact_types:
    monolith: # structure and configuration for monolith realization
        derived_from: tosca.artifacts.Root
        . . .
    microservices: # structure and configuration for microservices realization
        derived_from: tosca.artifacts.Root
        . . .
    faas: # structure and configuration for faas realization
        derived_from: tosca.artifacts.Root
        . . .

topology_templates: # VNF architecture specification
    . . .
```

FIG. 9

ORCHESTRATION OF VIRTUALIZATION TECHNOLOGY AND APPLICATION IMPLEMENTATION

CROSS REFERENCE TO RELATED APPLICATION

This application is a 35 U.S.C. § 371 national stage application of PCT International Application No. PCT/EP2020/059147 filed on Mar. 31, 2020, the disclosure and content of which is incorporated by reference herein in its entirety.

TECHNICAL FIELD

Embodiments of the present disclosure relate to a method and a system for orchestration of a virtualization technology and an application implementation, specifically for a virtual network function application, and in particular at a time when the virtual network function application is to be deployed, or when a lifecycle management event (such as a scaling, migration or update) occurs.

BACKGROUND

Historically, software was designed for a specific machine abstraction, which generally resulted in monolith applications that could be deployed on a single physical host/machine. This close integration of monolith software design and physical machine/host carried on when physical machines were substituted by virtual machines (VMs), running monolith applications. With the evolution of virtualization technologies from VMs to micro-VMs/Unikernels to containers, software design patterns have also evolved towards micro-services and more recently Function-as-a-Service (FaaS)/Serverless designs.

FIG. 1 depicts this evolution of application design and virtualization technology. Thus, FIG. 1 shows a virtual machine (VM) 101, running a monolith application 102; micro-VMs/Unikernels 103 running micro-services 104; and containers 105 running Functions 106. There is at least a synergy between the software design and the virtualization technology that hosts it, and sometimes there is an explicit dependency of an application that can only be met using a specific virtualization technology. For example, an application requiring specialized kernel features can only be hosted on virtual machines running that specialized kernel.

Every combination of virtualization technology and application design has its distinct set of advantages and disadvantages. For example, VMs provide isolation and specialized kernel features but usually have a bigger resource footprint on the physical infrastructure. Containers provide resource efficient virtualization but have less strict isolation guarantees. On the software design front, monolith applications have fewer deployment units to orchestrate in the cloud and do not introduce inter-service network communication overhead like microservices based applications as all service processes are enclosed in the same deployment unit. However, monoliths are not suited to the modern Continuous Integration/Continuous Delivery (CI/CD) pipelines and, due to the bigger resource footprint, may not be suited to resource constrained environments like edge clouds. Microservices and Serverless design patterns support CI/CD pipelines, but introduce a bigger management overhead for their deployment and life-cycle management. Function-as-a-Service (FaaS)/Serverless applications have an even smaller resource footprint, as they get deployed and removed dynamically at runtime, but they introduce latency to the overall execution process.

In general, with the evolution of software design from monoliths towards microservices and FaaS, the units of deployment for a Virtual Network Function (VNF) have increased with smaller compute resource footprint but the overhead on the communication network and management requirements have increased as micro-services distributed across the infrastructure must be orchestrated and allowed to communicate among themselves to deliver the required service.

The different virtualization technology platforms may exist as isolated cloud infrastructures (e.g. Openstack vs Kubernetes).

FIG. 2 depicts three examples of isolated cloud infrastructures providing a specific virtualization technology for hosting an application. Each of these virtualization platforms provides a virtualized compute unit that can host a VNF with a "preferred" software design, which is suited to the virtualization technology and cloud management architecture of that platform. Specifically, FIG. 2 shows a VM (or micro-VM) cloud platform 201 hosting a VM-oriented application design 202; a container cloud platform 203 hosting a container oriented (micro-services based) application design 204; and a serverless cloud platform 205 hosting a Faas oriented application design.

SUMMARY

The virtualization technology and the "preferred" software design of each cloud platform to run a VNF results in a number of issues.

For example, each cloud platform enforces the use of its own platform-specific methods and technologies for virtualized service design and deployment on the platform user, including application packaging and life-cycle management procedures at design time. For example, to deploy an application on an Openstack cloud platform, it must be specified in a supported service specification language like TOSCA (Topology and Orchestration Specification for Cloud Applications) or HEAT Orchestration Templates (HOT) and must use VMs as virtualization technology. These platform specific service design and orchestration tools complicate the migration of a service across cloud infrastructures that use different set of technologies and tools.

As another example, each cloud platform implicitly enforces a software design that may not be optimal for either the application or the cloud platform resource consumption or both. For example, running a small function in a full sized VM on OpenStack is resource inefficient, which thereby implicitly enforces a monolith design of combining multiple services in a single machine, but this is not preferred for Continuous Integration/Continuous Delivery (CI/CD) pipelines. This dumping of services in a single deployment unit also negates the advantages of microservices e.g. elastic scaling.

As a further example, cloud platforms are inherently multi-tenant and, while the platform user designs the service only taking into consideration the capabilities of the platform and the requirements of the virtualized service, there are many other factors that can be known only at runtime, that may change the configuration of the designed service. For example, other services that are hosted on the same infrastructure may have an impact in terms of security, performance etc.

As another example, the application lifecycle management actions (CREATE, UPDATE, SCALE, MIGRATE, DELETE etc.) are constrained by the platform capabilities. For example, Openstack provides easier horizontal scaling capability but not vertical scaling. This limits the optimization of resource utilization in the cloud platform.

Recently, technology enablers have been developed to combine the different virtualization technologies and runtimes in a single cloud platform.

FIG. 3 shows a cross domain orchestration platform architecture in a network function virtualization management and orchestration (MANO) solution such as the Open Network Automation Platform (ONAP) or Open Source MANO (OSM).

In other words, a single cloud platform is capable of running VMs, containers and FaaS runtimes as peers on the same underlying physical infrastructure. Having one cloud platform on which all available software implementations of a VNF (monolith, micro-services, FaaS etc.) and virtualization technologies (VMs and Containers) can be hosted and managed, opens up options for deployment and life-cycle management optimization that are not possible on isolated cloud platforms without compromises.

More specifically, FIG. 3 shows a cloud architecture 301 that supports service deployment and life-cycle management across multiple cloud infrastructures.

A virtual network function application 302 exists in a plurality of application implementations, that are suited to specific cloud platforms.

A cross-domain orchestrator 303 serves as an aggregator of the platforms. The orchestrator 303 may choose a specific application implementation, based on the underlying cloud platform chosen for deployment.

Specifically, as shown in FIG. 3, the orchestrator 2 may choose a VM-oriented application design 304 to be hosted on a VM (or micro-VM) cloud platform 305 hosting; or may choose a container oriented application design 306 to be hosted on a container cloud platform 307; or may choose a Faas oriented application design 308 to be hosted on a serverless cloud platform 309.

Thus, in each case, the link between the virtualization and the "preferred" application implementation is maintained.

According to a first aspect, there is provided a method of deployment of a virtual network function application in a multi-technology virtualization environment, wherein the multi-technology virtualization environment comprises a plurality of virtualization technologies, wherein the application exists in a plurality of application implementations, and wherein at least one of the virtualization technologies has a preferred one of said plurality of application implementations. The method comprises receiving a trigger for a deployment of the virtual network function application. In response to the received trigger, information is obtained about at least one optimization objective and about resource utilization in the multi-technology virtualization environment. Based on the received information, one of said plurality of virtualization technologies is selected for said deployment. In addition, one of said application implementations is selected, and the selected application implementation need not be the preferred application implementation for the selected virtualization technology. Finally, the deployment of the selected application implementation of the virtual network function application on the selected one of the virtualization technologies is initiated.

The application may exist in one or more of: a monolith application implementation; a micro-services application implementation; and a Function as a Service application implementation.

The multi-technology virtualization environment may comprise a virtual machine virtualization technology. In that case, the preferred application implementation of the virtual machine virtualization technology may be the monolith application implementation.

The multi-technology virtualization environment may comprise a container virtualization technology. In that case, the preferred application implementation of the container virtualization technology may be the micro-services application implementation.

The multi-technology virtualization environment may comprise a serverless virtualization technology. In that case, the preferred application implementation of the serverless virtualization technology may be the Function as a Service application implementation.

The deployment trigger may be received in response to a user request. The user request may identify the virtual network function application to be deployed. The user request may also include configuration information. The configuration information may relate to one or more of a capacity and a location of the deployment.

The deployment trigger may be received in response to a Life Cycle Management event. The Life Cycle Management event may be a deployment update, scale, migrate, or rollback.

Selecting one of said plurality of virtualization technologies, based on information about resource utilization in the multi-technology virtualization environment, may comprise using information about utilization of computational resources and/or of networking resources in the multi-technology virtualization environment.

Selecting one of said plurality of virtualization technologies, based on information about resource utilization in the multi-technology virtualization environment, may comprise using predictions of future resource utilization in the multi-technology virtualization environment. The predictions of future resource utilization in the multi-technology virtualization environment may be generated using machine learning.

Selecting one of said application implementations, based on information about resource utilization in the multi-technology virtualization environment, may comprise using information about a potential relationship between at least one of said application implementations and software already running on the selected one of said plurality of virtualization technologies.

Selecting one of said application implementations, based on information about resource utilization in the multi-technology virtualization environment, may comprise using predictions of future resource utilization in the multi-technology virtualization environment.

According to a second aspect, there is provided a computer program product, comprising a computer-readable medium, containing machine-readable instructions, for causing a suitably programmed processor to perform a method method of deployment of a virtual network function application in a multi-technology virtualization environment, wherein the multi-technology virtualization environment comprises a plurality of virtualization technologies, wherein the application exists in a plurality of application implementations, and wherein at least one of the virtualization technologies has a preferred one of said plurality of application implementations. The method comprises receiving a trigger for a deployment of the virtual network function application. In response to the received trigger, the method comprises obtaining information about at least one optimization objective and about resource utilization in the multi-technology virtualization environment. Based on the received information, the method comprises selecting for said deployment one of said plurality of virtualization technologies; and selecting one of said application implementations, wherein the selected application implementation need not be the preferred application implementation for the selected virtualization technology. The method further comprises initiating the deployment of the selected application implementation of the virtual network function application on the selected one of the virtualization technologies.

According to a third aspect, there is provided an orchestrator, configured for deploying a virtual network function application in a multi-technology virtualization environment, wherein the multi-technology virtualization environment comprises a plurality of virtualization technologies, wherein the application exists in a plurality of application implementations, and wherein at least one of the virtualization technologies has a preferred one of said plurality of application implementations. The orchestrator is configured to perform a method comprising: receiving a trigger for a deployment of the virtual network function application; and in response to the received trigger, obtaining information about at least one optimization objective and about resource utilization in the multi-technology virtualization environment. The orchestrator is further configured, based on the received information, to select for said deployment one of said plurality of virtualization technologies; and to select one of said application implementations, wherein the selected application implementation need not be the preferred application implementation for the selected virtualization technology. The orchestrator is further configured to initiate the deployment of the selected application implementation of the virtual network function application on the selected one of the virtualization technologies.

This has the advantage that the VNF specification provided by the user is decoupled from its manifestation in the cloud platform, in terms of the virtualization technology and application implementation, in a way that is not possible in the state of the art cloud platforms. It allows an orchestrator to freely choose the virtualization technology and software design combination that is suited to the resource availability instead of the enforced choice by the service designer. It also enables the orchestrator to realize multiple copies of a VNF (replicas) using different combinations of virtualization technologies and software design.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 8 shows a file structure for a high level VNF deployment intent;

FIG. 9 shows a specification for an example VNF;

DETAILED DESCRIPTION

Figure 1:
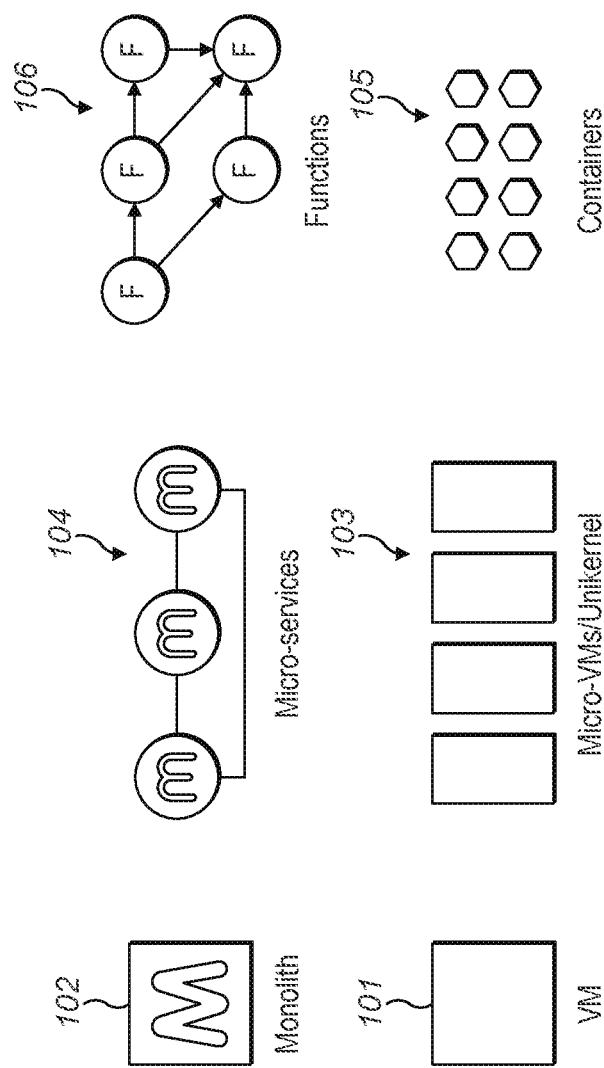
FIG. 1 illustrates the evolution of application design and virtualization technology.
Figure 2:
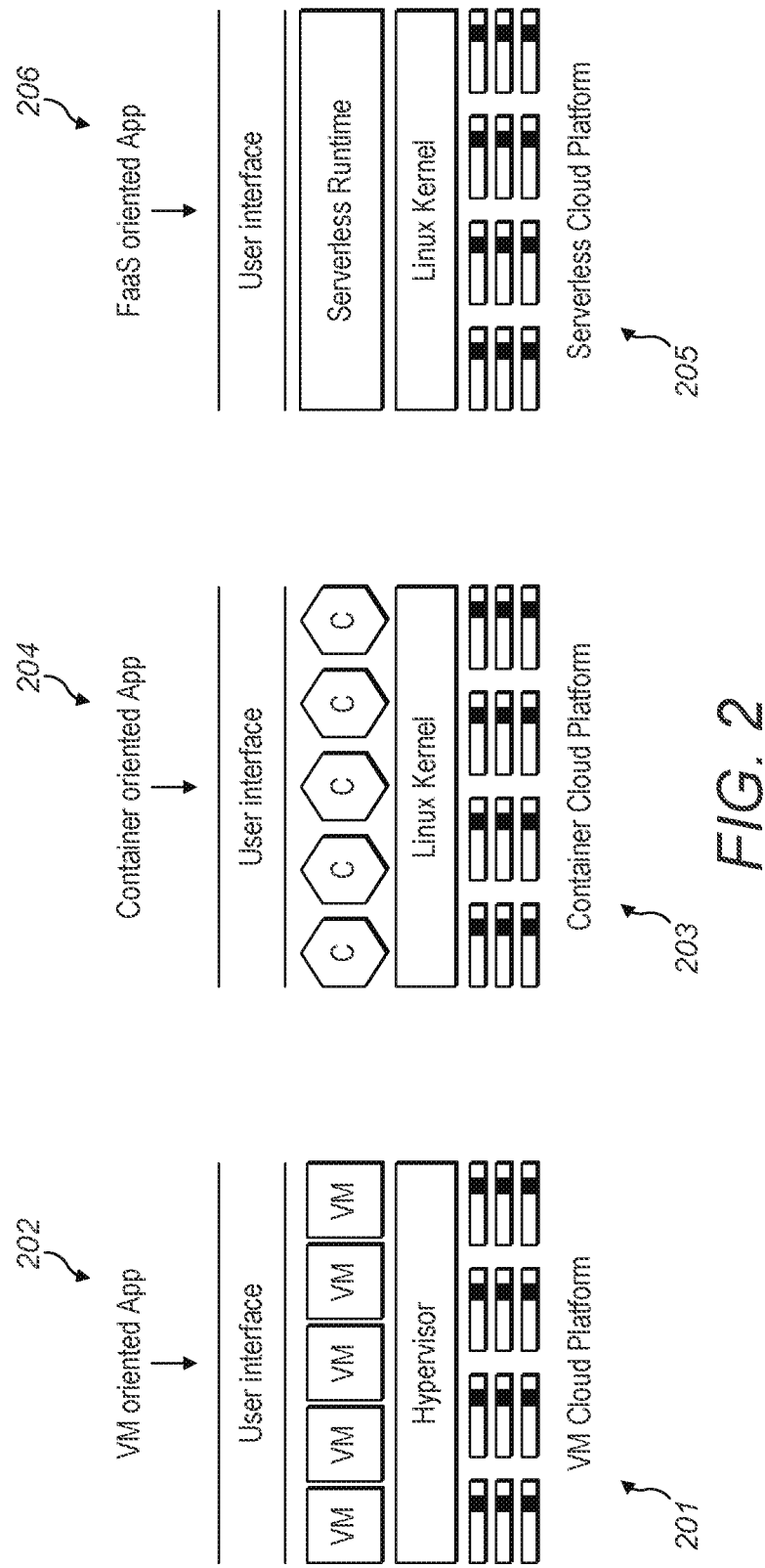
FIG. 2 shows examples of isolated cloud infrastructures providing a specific virtualization technology for hosting an application.
Figure 3:
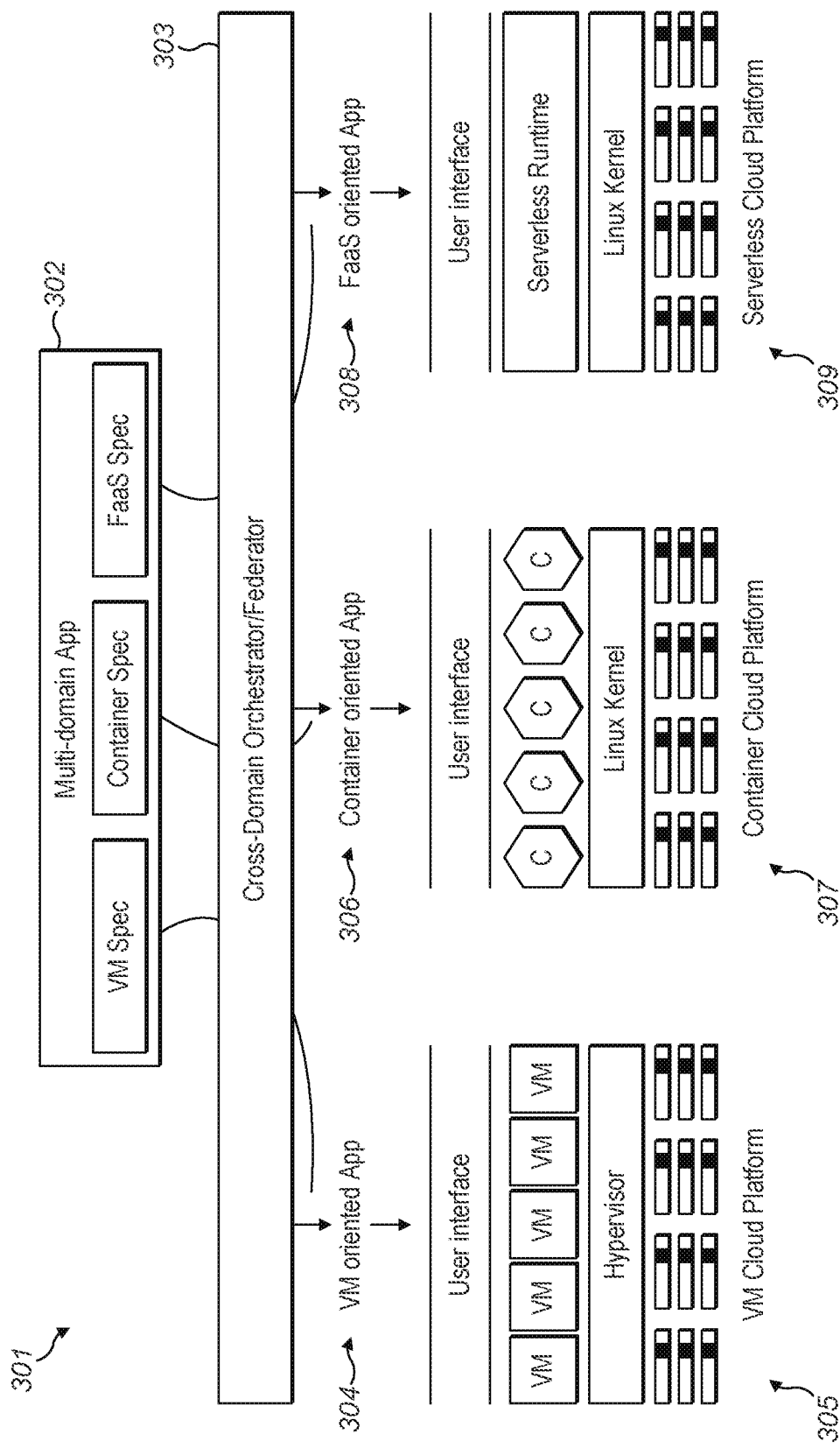
FIG. 3 shows a cloud architecture that supports service deployment and life-cycle management across multiple cloud infrastructures.
Figure 4:
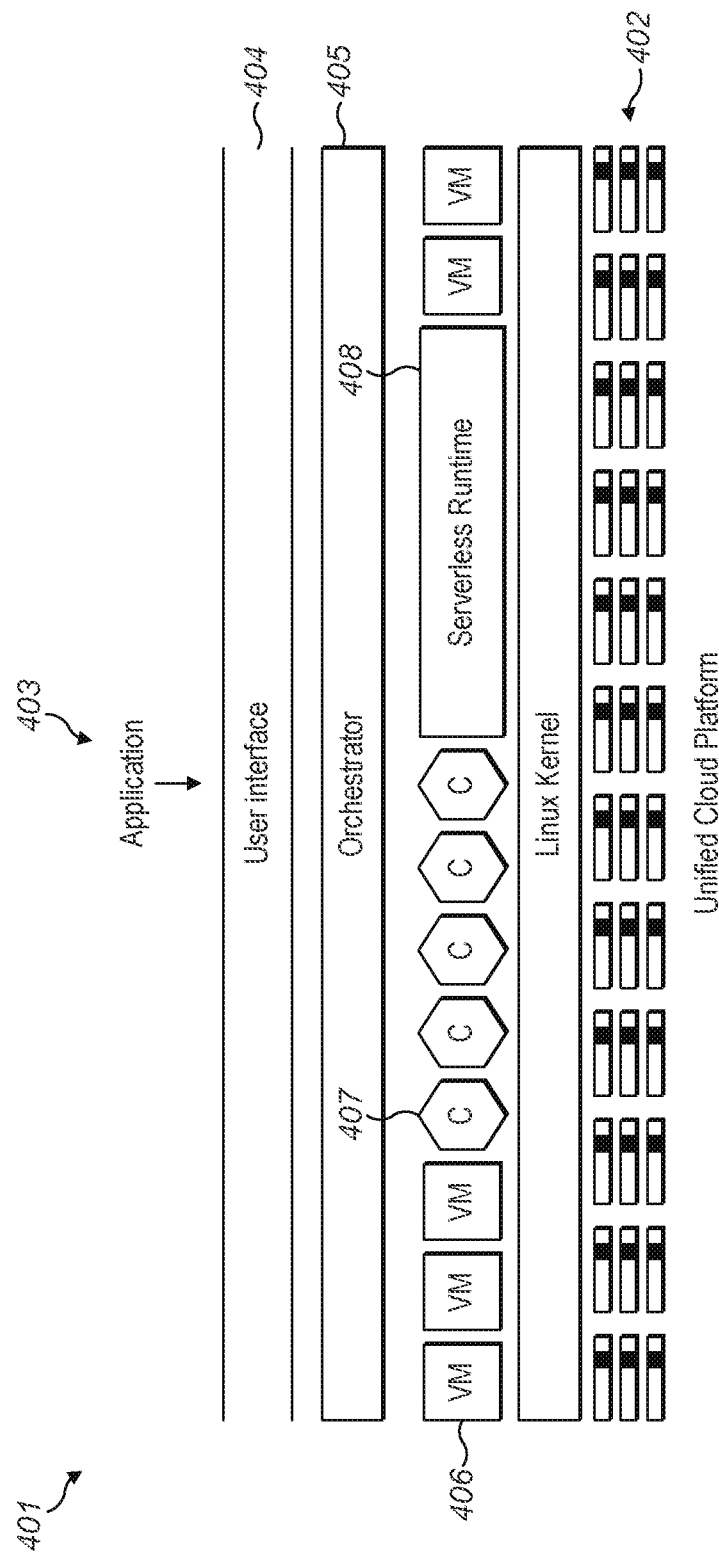
FIG. 4 shows a cloud platform that integrates different virtualization technologies in a single cloud infrastructure.

FIG. 4 illustrates a cloud platform that integrates multiple different virtualization technologies in a single cloud infrastructure and provides a single service deployment and Life Cycle Management (LCM) pipeline. As described in more detail below, this allows for the decoupling of the "preferred" virtualization and software design, and allows the coupling of the virtualization and the software design to be created at runtime instead of design time, considering all aspects, including the runtime state of the infrastructure and other services. That is, when a Virtual Network Function (VNF) is to be deployed, both its virtualization technology and the software design are determined at runtime by an orchestrator in order to optimize the use of the underlying cloud infrastructure while providing the required Quality of Service (QoS) for the VNF.

Thus, FIG. 4 shows an architecture 401, comprising a unified cloud platform 402. When a request to deploy a Virtual Network Function application 403 is applied to a user interface 404, an orchestrator 405 determines the virtualization technology (for example, a virtual machine 406, a container virtualization technology 407, or a serverless virtualization technology 408), and also selects an application implementation (i.e. a software design), without being constrained by any preferred coupling between the selected virtualization technology and any particular application implementation.

FIG. 4 therefore represents a multi-technology virtualization environment, which is configured to deploy applications using a plurality of virtualization technologies.

As examples, the virtualization technologies may include: a virtual machine virtualization technology, in which all processes of the VNF are co-located, can communicate through inter-process communication (IPC), have access to the same hardware resources, and are managed as a single deployment unit; a container virtualization technology, in which there are multiple deployment units for a single VNF, using a networking stack for communication, and the deployment units are isolated; and/or a serverless virtualization technology, in which there are multiple deployment units, which are not active all the time, but only activated when a request for service arrives, and which may use IPC or networking.

As described above, an application can be implemented in several software design paradigms, for example as a monolith, as micro-services and as a Function-as-a-Service (FaaS). The choice of a specific software design is influenced by many factors and there are pros and cons of each choice both for the software developers (organization) and the cloud platform that hosts it.

If the cloud platform can host a virtualized service using many virtualization technologies, as shown in FIG. 4, it is advantageous to maintain several of these application implementations (software designs) and orchestrate them at runtime. Creating the multiple versions of a service may incur additional costs for the service developers, but it allows for very high flexibility to the cloud platform that hosts the service.

Figure 5:
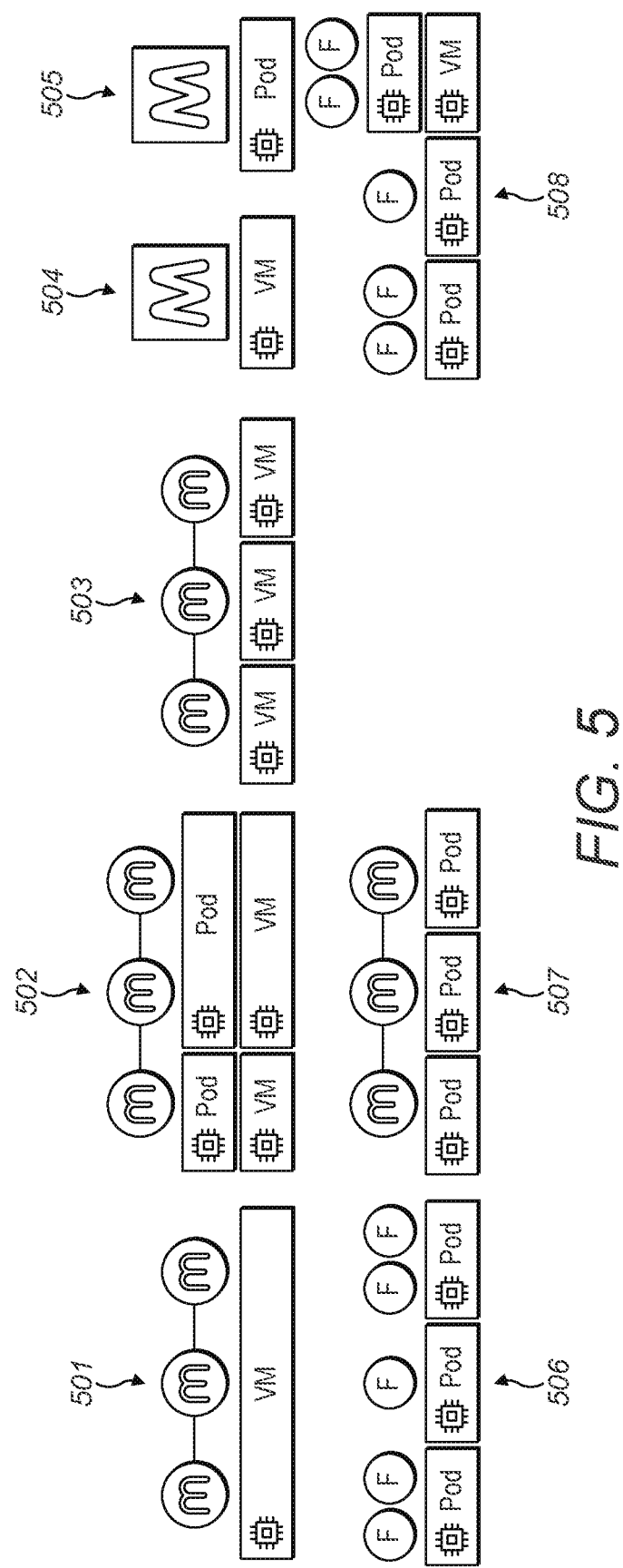
FIG. 5 shows different virtualization and application implementation combinations for the same cloud application.

FIG. 5 shows a subset of the possible options for combining a virtualization technology and an application implementation, and hosting it on a single cloud platform. Other possibilities also exist.

Thus, FIG. 5 shows one possibility 501 in which a micro-services application implementation runs on a virtual machine virtualization technology.

FIG. 5 also shows a possibility 502 in which a micro-services application implementation runs on Pods ("Pods" being the Kubernetes term for infrastructure containers), on a virtual machine virtualization technology.

FIG. 5 also shows a possibility 503 in which a micro-services application implementation runs on a virtual machine virtualization technology with multiple virtual machines.

FIG. 5 also shows a possibility 504 in which a monolith application implementation runs on a virtual machine virtualization technology.

FIG. 5 also shows a possibility 505 in which a monolith application implementation runs on a Pod virtualization technology.

FIG. 5 also shows a possibility 506 in which a FaaS application implementation runs on a Pod virtualization technology.

FIG. 5 also shows a possibility 507 in which a micro-services application implementation runs on a Pod virtualization technology.

FIG. 5 also shows a possibility 508 in which a FaaS application implementation runs on a Pod virtualization technology, with a part of the Pod virtualization running on a virtual machine virtualization technology.

Each example shown as a possibility in FIG. 5 has a different impact on the underlying infrastructure hosting it, including on computation, memory, storage, networking, and orchestration/management overhead. Each combination also has a different performance, security and LCM profile.

As discussed in more detail below, these differences form the criteria for an orchestrator to determine which realization is best suited to the current state of the infrastructure resource availability.

Figure 6:
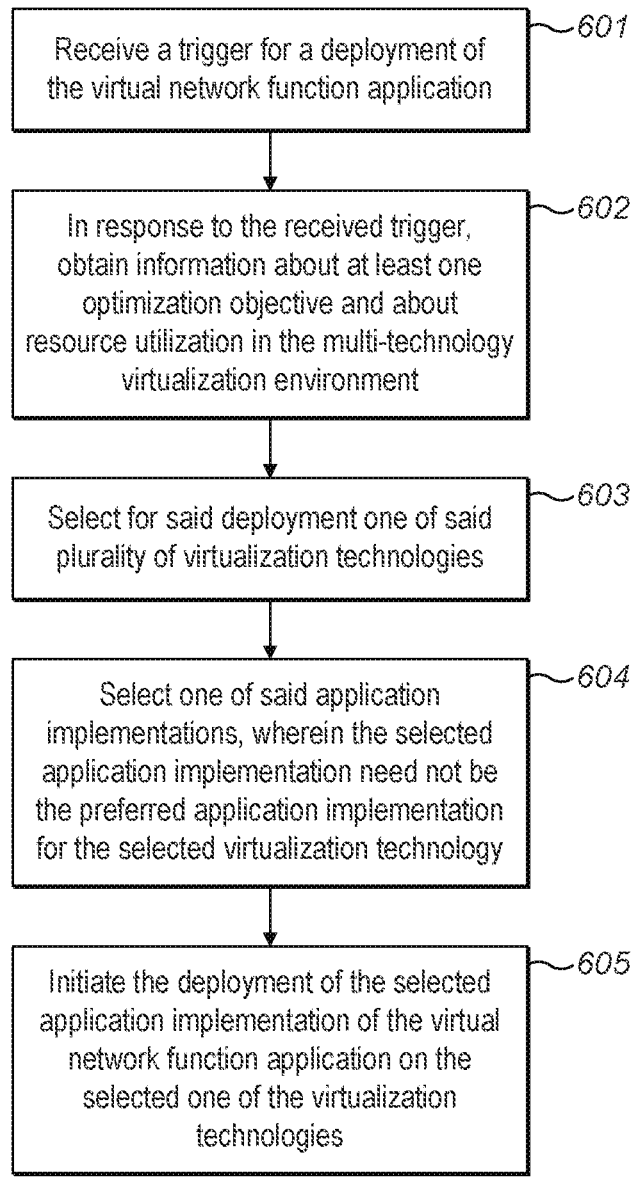
FIG. 6 is a flow chart, illustrating a method of deployment of a virtual network function application in a multi-technology virtualization environment.

FIG. 6 is a flow chart, illustrating a method of deployment of a virtual network function application in a multi-technology virtualization environment. The multi-technology virtualization environment comprises a plurality of virtualization technologies, and the application exists in a plurality of application implementations. At least one of the virtualization technologies has a preferred one of said plurality of application implementations.

The method starts at step 601, by receiving a trigger for a deployment of the virtual network function application.

The deployment trigger may be received in response to a user request. In some embodiments, the user request identifies the virtual network function application to be deployed, and also includes configuration information. The configuration information may relate to one or more of a capacity and a location of the deployment. In embodiments, a high level deployment intent could also specify a Quality of Service (QoS) or Service Level Agreement (SLA) relating to the VNF, either in specific terms (for example expressed as requirements relating to the latency, throughput etc) or in general terms (for example expressed as a requirement for "Fair", "Good", or "Excellent" performance). The orchestrator is able to interpret those requirements, and map, or convert, them to specific VNF parameters. For example, latency and throughput requirements could affect the placement on the host, or the location etc. Requirements for Fair or Good performance can be mapped to the host, usage of resources, co-location with other services etc.

Alternatively, the deployment trigger may be received in response to a Lifecycle Management Event.

In response to the received trigger, at step 602, the method involves obtaining information about at least one optimization objective and about resource utilization in the multi-technology virtualization environment.

Based on the received information, at step 603, the method selects for said deployment one of said plurality of virtualization technologies.

In embodiments, the selection comprises using information about utilization of computational resources and/or of networking resources in the multi-technology virtualization environment. In certain embodiments, this comprises using predictions of future resource utilization in the multi-technology virtualization environment.

At step 604, the method selects one of said application implementations, wherein the selected application implementation need not be the preferred application implementation for the selected virtualization technology.

At step 605, the method initiates the deployment of the selected application implementation of the virtual network function application on the selected one of the virtualization technologies.

Thus, the VNF deployment and orchestration process automates the dynamic selection of the virtualization technology and the software design (i.e. the application implementation) at runtime with the main benefit of optimizing the underlying infrastructure resource utilization. Thus, it avoids the user determined selection at design time of the virtualization technology and software implementation, in order to optimize the infrastructure resource utilization. The orchestration process supporting this feature is executed for all VNF management events i.e., deployment and lifecycle management events.

Figure 7:
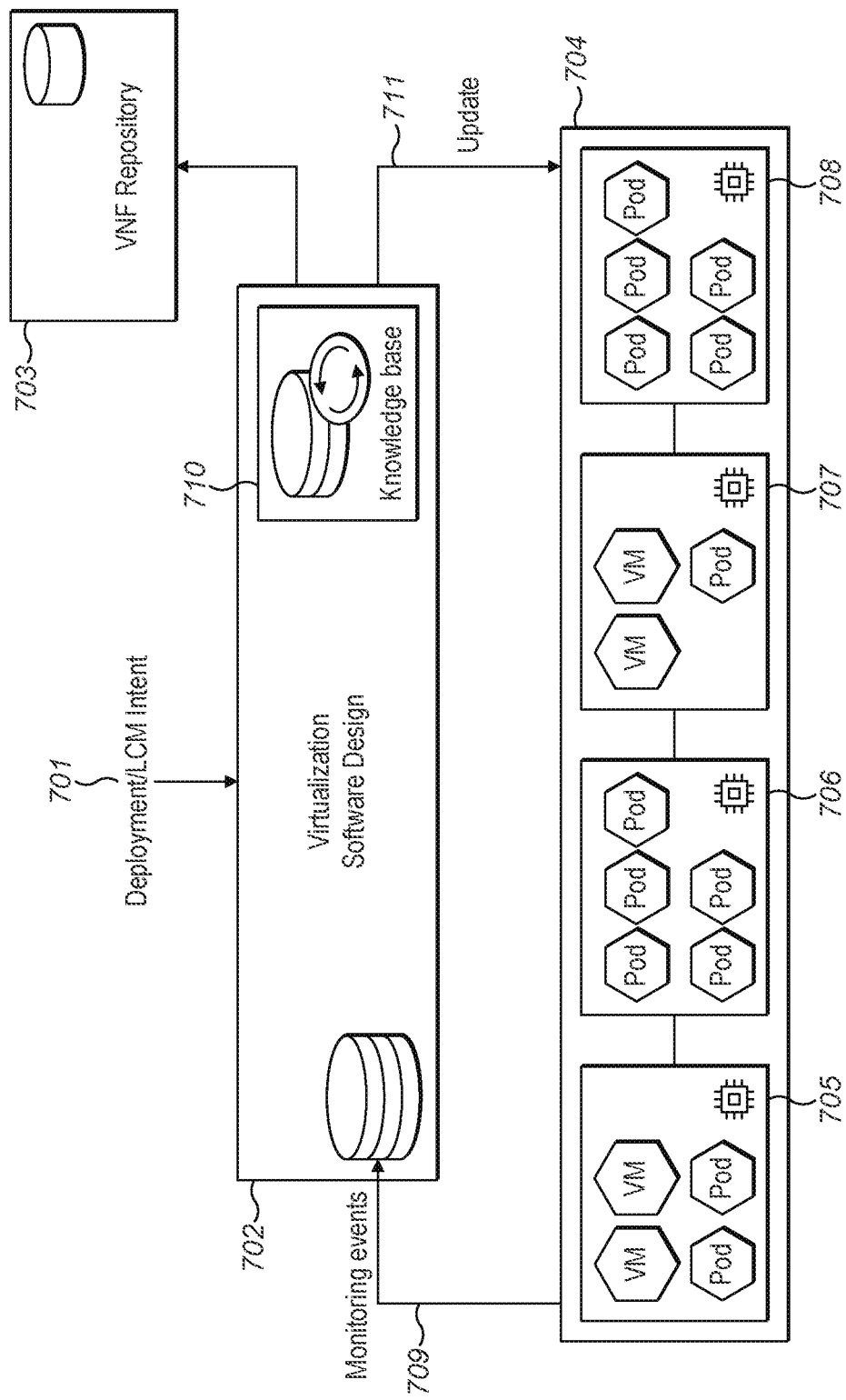
FIG. 7 shows in more detail steps performed during the method of FIG. 6.

FIG. 7 shows in more detail a method in accordance with FIG. 6.

As shown at 701, the initial trigger for a VNF orchestration comes from a user or system intent. The user can be a human administrator who decides to deploy the VNF via a dashboard. A system intent can be a process external to the orchestrator 702 that can trigger the VNF deployment, or it can be a lifecycle management (LCM) event, such as scale, migrate, update etc., based on external criteria. LCM events may be based on user or system defined triggers. User defined triggers may be based on service parameters, such as the number of connected users per VNF instance, or the resource use per VNF instance. System triggers are generally based on infrastructure level parameters.

The user intent can be an intent specification that provides the name of the VNF, and high-level configuration information. Thus, the user request identifies the virtual network function application to be deployed. The configuration information may relate to one or more of a capacity and a location of the deployment. In embodiments, a high level deployment intent could also specify a Quality of Service (QoS) or Service Level Agreement (SLA) relating to the VNF, either in specific terms (for example expressed as requirements relating to the latency, throughput etc) or in general terms (for example expressed as a requirement for "Fair", "Good", or "Excellent" performance). The orchestrator is able to interpret those requirements, and map, or convert, them to specific VNF parameters. For example, latency and throughput requirements could affect the placement on the host, or the location etc. Requirements for Fair or Good performance can be mapped to the host, usage of resources, co-location with other services etc.

The intent specification and configuration information can be provided in any form of existing intent specification methods. These include using natural language (for example, "Deploy example VNF in location-X with flavor medium"), using a domain specific language, or using a graphical user interface provided by the orchestrator.

By way of example, FIG. 8 shows a suitable YAML (YAML Ain't Markup Language) structure that can be used to indicate an intent to deploy a specific VNF.

With this intent, the orchestrator 702 has the needed functionality to convert the intent into a deployment trigger. For the stated intent methods, this conversion can be based on natural language processing, domain specific languages and direct mapping. This embodiment assumes that the VNF software and configurations are already onboarded to a VNF repository 703 as used in existing cloud platforms (for example image registries). The configuration associated with a VNF in the VNF repository also contains the resource footprint information i.e., the virtualized resources required to host the VNF. The orchestrator maps a descriptive term e.g. "Capacity" or action e.g. "Click of button" to a concrete realization of required infrastructure resources specified as part of the VNF configuration in the repository.

Alternatively, the user intent can be a VNF descriptor, written in a service definition language like TOSCA (Topology and Orchestration Specification for Cloud Applications) or YAML, together with the required software artefacts (e.g. software images) providing complete topology and configurations for all or a set of desired software implementations.

By way of example, FIG. 9 illustrates an example of a descriptor based on the Oasis TOSCA structure. In this embodiment, the orchestrator 702 acquires the software and configuration from the service template.

Alternatively, the trigger for the orchestrator 702 to execute its virtualization and software design orchestration process can be an Lifecycle Management (LCM) event for a deployed VNF, triggered by an external process.

As is known, a Life Cycle Management event may be an instruction for a deployment update, scale, migrate, or rollback, for example.

FIG. 7 also shows the cloud infrastructure 704. In this illustrated example, the cloud infrastructure 704 comprises multiple hosts 705, 706, 707, 708, and these contain a mixture of virtual machines VM and Pods, where pods are infrastructure containers that provide computation, network and storage for the function running inside the pod.

A monitoring service runs in the cloud infrastructure 704.

The monitoring service aggregates metrics collected in the orchestrator's database related to (i) the available and used physical infrastructure resources including CPU, memory, storage, networking, graphics processing etc., (ii) Key Performance Indicators (KPI) such as dropped packets, service latency, load etc. on deployed services/VNFs.

The raw metrics are gathered and transformed by the monitoring service into "monitoring events" 709 that can be used by the orchestrator. This transformation can be based on (a) statistical aggregation methods (mean, median, mode of consumption values for infrastructure resources and service SLAs over a time window) or (b) using data analytics and machine learning algorithms (e.g. Neural Networks, Decision Trees etc.) to provide a predictive estimate on the state transitions at the infrastructure and service levels (e.g. availability of CPU, GPU, Networking resources over the next x time units or Predicted number of connected users to a service instance over the next x time units).

The orchestrator receives the monitoring events 709 generated by and on the information in the orchestrator maintained knowledge-base.

As described above, the orchestrator 702 selects the virtualization technology and the application implementation.

In one embodiment, the orchestrator 702 bases the selection of the virtualization technology and the application implementation on information about at least one optimization objective and about resource utilization.

The information about the resource utilization is contained in the received monitoring events 709. The selection may also use predictions of future resource utilization in the multi-technology virtualization environment, where the predictions are made using machine learning, and may also be based on the received monitoring events 709.

The information about the optimization objective is received from the platform administrator, who steers the decisions of the orchestrator towards specific platform optimization objectives. The policy targets defined by the administrator for the orchestrator to achieve can be widely ranged and can include targets for resource usage, service isolation and QoS/QoE optimization targets. The policy is stored in the knowledge base 710 of the orchestrator 702, and specifies the targets for the orchestrator to achieve in the cloud platform.

For instance, the administrator can set a policy including an optimization objective aimed at optimizing cloud infrastructure resource utilization, and the orchestrator makes its decisions towards achieving this policy target. That is, it can deploy a VNF such that its resource footprint on the infrastructure is a minimum, if this is required to achieve the infrastructure resource utilization objective.

As shown at 711, the orchestrator 702 deploys the selected application implementation on the selected virtualization.

The chosen coupling of the virtualization and the implementation coupling has to be placed on a host for execution, but the candidate host is represented implicitly by the parameters used by the orchestrator 702 (such as the resources available on it, other services running on it) for its decision.

Figure 10:
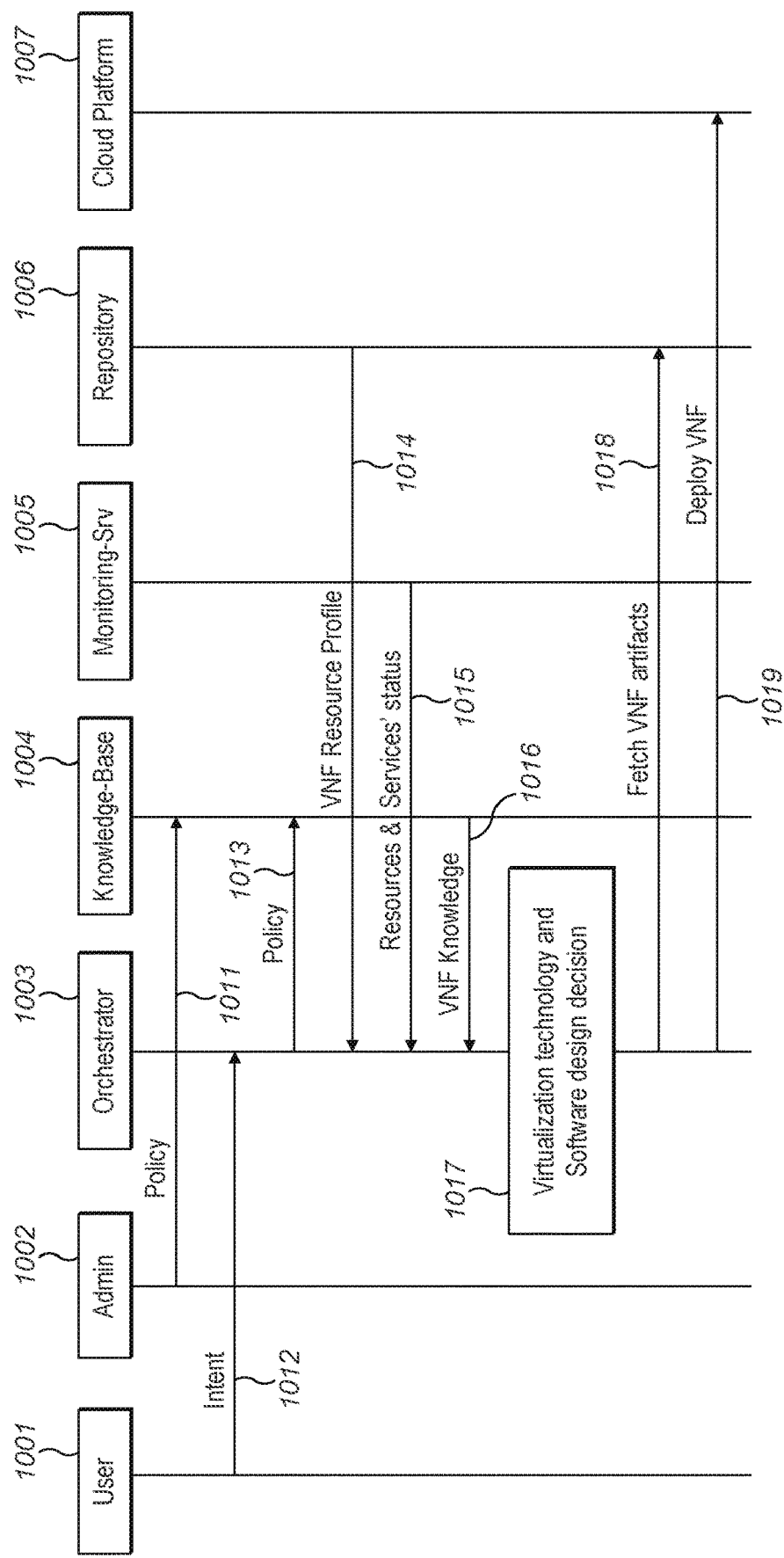
FIG. 10 illustrates a deployment workflow.

FIG. 10 is a signalling diagram, illustrating a further method in accordance with FIG. 6.

Thus, FIG. 10 shows actions taken by, or using, a user 1001 (which may be a human administrator or a separate process), a platform administrator 1002, an orchestrator 1003, a knowledge base 1004, a monitoring service 1005, a repository 1006, and the cloud platform 1007, where these are described in more detail with reference to FIG. 7.

Thus, at 1011, as a preliminary step, FIG. 10 shows the platform administrator 1002 storing a policy, including at least one optimization objective, in the knowledge base 1004.

At 1012, a VNF deployment request or LCM intent is received from a user or process 1001.

In response thereto, at 1013, the orchestrator 1003 reads the policy from the knowledge base 1004, in order to retrieve the optimization target(s). At 1014, the orchestrator 1003 retrieves the available software implementation designs and their respective resource footprints from the repository 1006.

At 1015, the orchestrator 1003 retrieves the current state of the resource availability from the monitoring service 1005.

In addition, at 1016, the orchestrator 1003 retrieves VNF knowledge from the knowledge base 1004. The knowledge base is a long-term store of information in the form of a database, which includes information about previous deployments of the VNF, for example relating to its resource utilization (such as the average resource footprint in different cloud and software couplings) and relating to its KPIs (failure rate, management overhead etc. The knowledge base 1004 may also store information about the effect of the VNF on services that are co-located on shared infrastructure (e.g. affinity, anti-affinity, security issues). The knowledge base 1004 may also store static information that relates to the trade-offs that exist between the different virtualization technologies and software designs. In addition, the knowledge base 1004 may also store information that is relevant for all VNFs, for example information that a VM has a higher resource footprint on a single node and slower boot times than other virtualization technologies, but offers specialized kernel and security, while containers have low resource footprints and faster boot times, but are less secure, etc.

At 1017, the orchestrator 1003 then decides on the VNF technology and application implementation to be deployed.

At 1018, the orchestrator 1003 fetches the required artifacts e.g. images, from the repository 1006.

At 1019, the orchestrator 1003 deploys the artifacts in the cloud platform 1007 on nodes with available resources.

Figure 11:
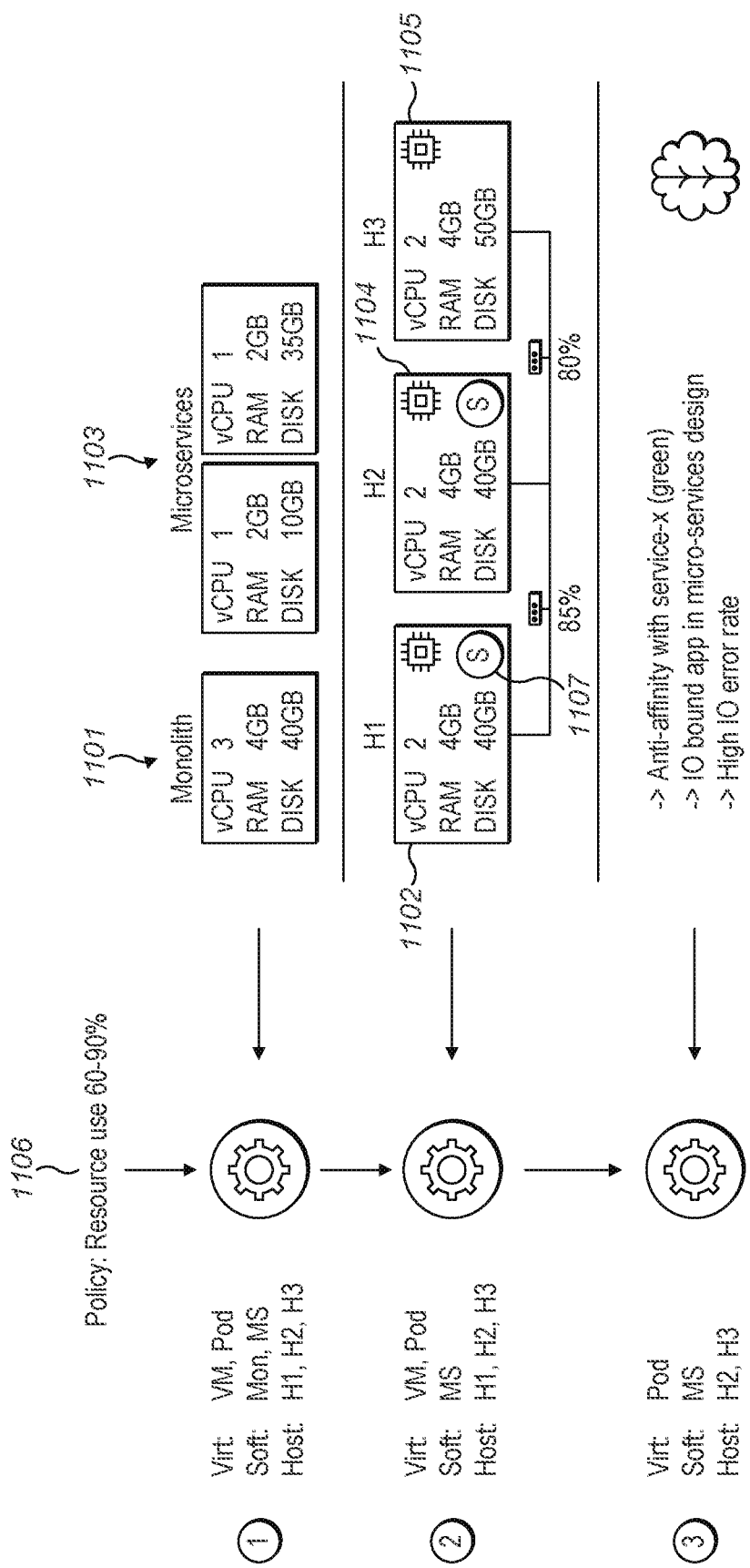
FIG. 11 illustrates an example of the deployment process.

FIG. 11 shows an example of this process which considers a VNF that is available as monolith and micro-services (MS) designs. In monolith design 1101, the VNF can only be hosted on one node 1102, while in microservices design 1103, two deployment units 1104, 1105 can be hosted on one or two hosts. The two implementations are onboarded to the repository, with a description of the required resources for each design.

In this example, we assume that an administrator policy 1106 is in place that targets resource utilization (CPU, Memory, Networking etc.) as an optimization objective, and the target is that this should be in the range of 60% to 90%.

With this policy in place, the deployment of this example VNF will follow the three steps presented in FIG. 11.

As shown at 1111, the orchestrator considers all onboarded VNF implementations (monolith & microservices) and all available virtualization technologies (VM & Pods) on all three hosts (H1, H2, H3).

As shown at 1112, the orchestrator gets the resource status from the monitoring service which excludes the monolith deployment options as none of the three hosts have the resources available as specified for monolith deployment. This leaves only microservices based deployment option with VM and Pod as virtualization technology and all three hosts as candidates to run the two parts of the VNF as microservices.

As shown at 1113, the orchestrator fetches information from the knowledge base about the VNF being deployed as microservices application. In this instance, by way of an illustrative example, this VNF has anti-affinity with the service 1107 that is hosted on H1 (where an anti-affinity means that they should not share the same host). This information reduces the possible hosts to H2 and H3.

Assuming further that previous deployment of this VNF as microservices on separate hosts categorized it as an Input/Output bound (IO bound) application, i.e. an application that is data intensive, without being processing intensive. An application can be categorized as IO bound for example if it adds more than 20% load on the networking links. Further, information about previous deployments also indicates a high IO error when deployed across multiple hosts. This information indicates that the preferred host is H3 and the preferred virtualization is Pod. H2 is excluded to avoid IO overhead and VM as virtualization technology is excluded based on the known trade-off between VM and Pod, where VM has higher resource footprint compared to Pods (i.e. containers).

Therefore, as shown at 1114, the example VNF is deployed as a microservices application on two Pods on the host H3.

With a different policy in place (for example to ensure compliance with a specific Service Level Agreement, SLA), the same steps could have resulted in a microservices based application implementation deployed on H2 and H3, because spreading a microservices application across different hosts increases robustness, although it has a higher footprint on network communication.

Similarly, with a policy related to service isolation and security in place, the same process could result in a microservices based application implementation deployed in one or two VMs instead of Pod, because it is acceptable to trade resource efficiency for increased security.

In another embodiment, the virtualization technology and software design selection is determined through a closed-loop operation, where the orchestrator uses a pre-coded logic for decision making, using predictions and information in the knowledge base. The orchestrator considers (i) available VNF implementations and their resource footprint (ii) and predictions of the impact of the deployment or LCM of the VNF. The "impact" can include resource contention with collocated services, security issues, bad neighbor etc. The prediction of the impact of VNF deployment or LCM is based on state-of-the-art artificial intelligence/machine learning prediction algorithms, for example using Deep Neural Networks (DNN), Short Long Term Memory (SLTM) algorithms etc., that run as part of the monitoring data to monitoring events transformation. The orchestrator also considers knowledge from the knowledge base as previously described.

Figure 12:
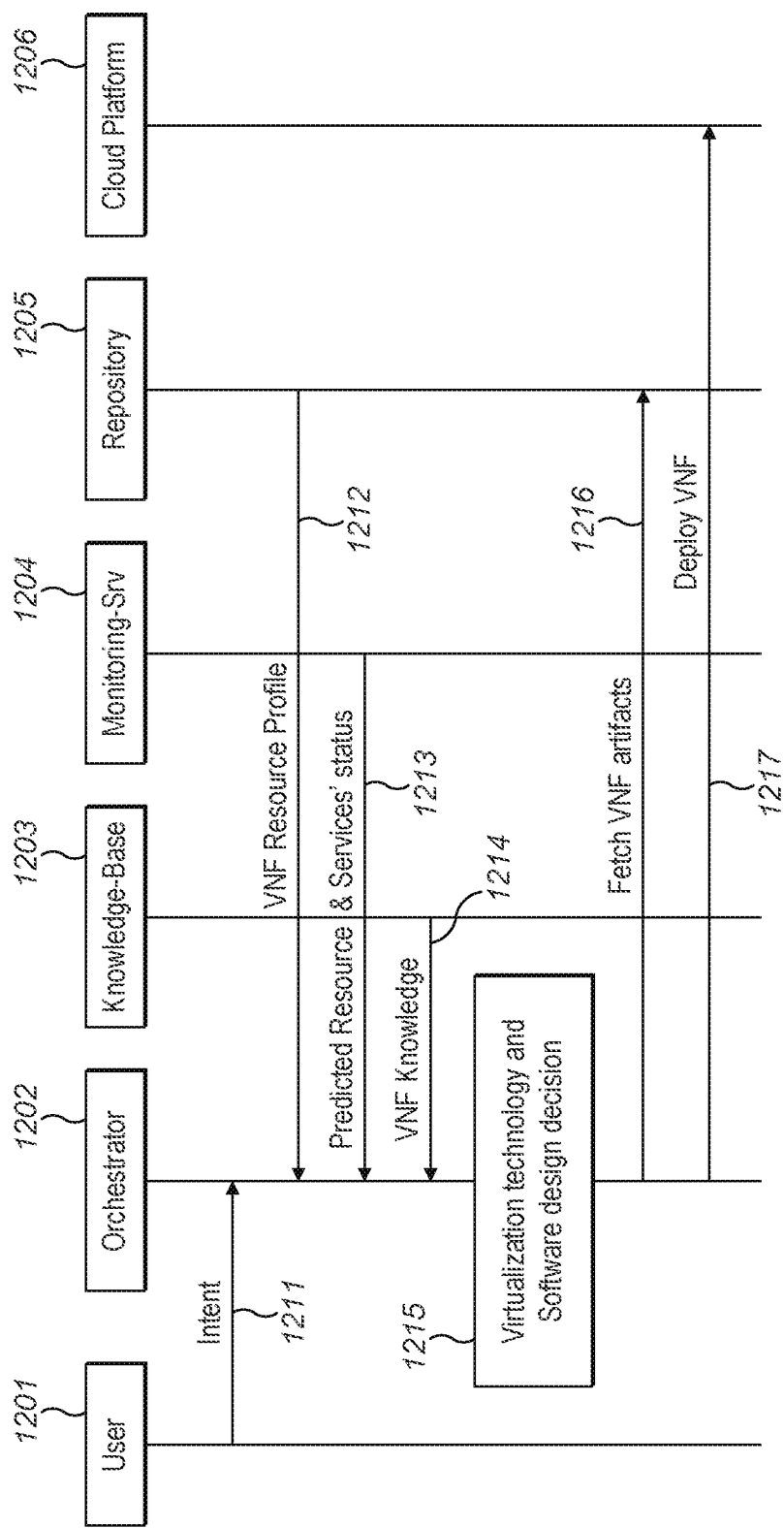
FIG. 12 illustrates another example of a deployment workflow.

FIG. 12 is a signalling diagram, illustrating this embodiment as a further method in accordance with FIG. 6.

Thus, FIG. 12 shows actions taken by, or using, a user 1201 (which may be a human administrator or a separate process), an orchestrator 1202, a knowledge base 1203, a monitoring service 1204, a repository 1205, and the cloud platform 1206, where these are described in more detail with reference to FIG. 7.

In this embodiment, at 1211, a VNF deployment request or LCM intent is received from a user or process 1201.

In response thereto, at 1212, the orchestrator 1202 retrieves the list of onboarded software implementation designs and their respective resource footprint information from the repository 1205 as candidate software designs.

At 1213, the orchestrator 1202 receives from the monitoring service 1204 information relating to services running on the cloud platform 1206 and predictions of resource usage.

The orchestrator 1202 then predicts the impact of deploying the VNF in different possible virtualization technology and software design couplings. The prediction target is hard coded in the prediction algorithm used to transform monitoring data into monitoring events. For example, a service SLA predictor can transform incoming resource utilization data and service KPIs (number of served users, error rate etc.) into an estimate of the probability of resource availability in the next x-time units.

At 1214, the orchestrator 1202 retrieves information from the knowledge base 1203 relating to any affinity, anti-affinity or security conflicts with existing services and if available, previous deployment information for the VNF.

At 1215, the orchestrator uses the prediction and information from the knowledge base 1203 to decide on the selected virtualization technology and the selected software design (i.e. application implementation) to be deployed.

At 1216, the orchestrator 1202 then fetches the required artifacts e.g. images, from the repository 1205.

At 1217, the orchestrator 1202 deploys the artifacts in the cloud platform 1206 on nodes with available resources.

Thus, depending on the policy targets, or optimization objective, and depending on the resource requirements and availability, and the information in the knowledge base, a VNF may be deployed in its preferred software design and virtualization coupling, or may be deployed in other couplings. That is, the selected application implementation need not be the preferred application implementation for the selected virtualization technology. Moreover, this selection is made only at runtime, and so it can depend on the network conditions at that specific time.

Figure 13:
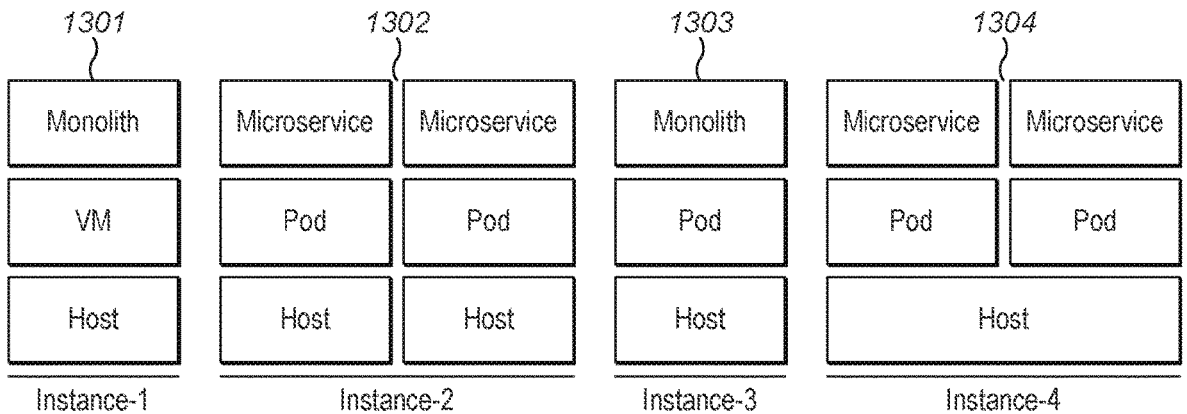
FIG. 13 illustrates an example of a deployment.

By way of example, FIG. 13 shows some examples of different instances in which an example VNF may be deployed.

Thus, in this example at a first time (Instance 1), as shown at 1301, the VNF is deployed as a monolith application implementation on a virtual machine virtualization technology on a host.

At a second time (Instance 2), as shown at 1302, the VNF is deployed as a micro-services application implementation on a Pod virtualization technology, on two hosts.

At a third time (Instance 3), as shown at 1303, the VNF is deployed as a monolith application implementation on a Pod virtualization technology.

At a fourth time (Instance 4), as shown at 1304, the VNF is deployed as a micro-services application implementation on a Pod virtualization technology, on a single host.

Figure 14:
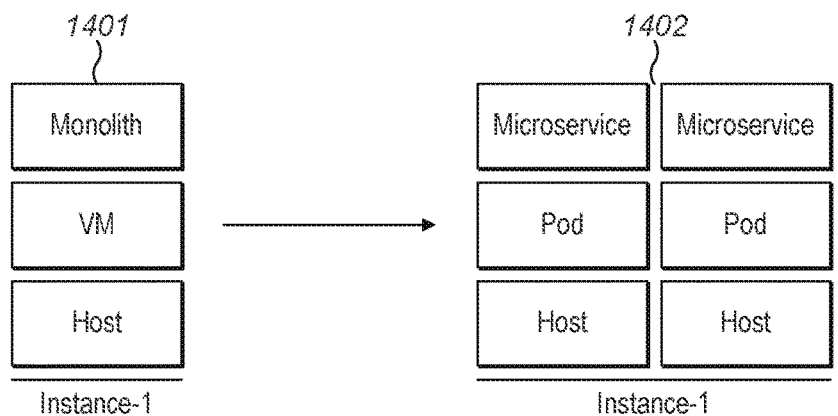
FIG. 14 illustrates another example of a deployment.

FIG. 14 illustrates the possibility that the coupling between the application implementation and the virtualization technology may change, in response to an LCM event.

Specifically, by way of example only, FIG. 14 illustrates an LCM migrate event, which occurs when the orchestrator removes a VNF from one host and places it on another. In existing cloud solutions, migrating a VNF from one host to another does not change its coupling.

However, in the example illustrated in FIG. 14, initially, as shown at 1401, the VNF is deployed as a monolith application implementation on a virtual machine virtualization technology on a host.

After the migration, as shown at 1402, the VNF is deployed as a micro-services application implementation on a Pod virtualization technology, on two hosts.

This is an example of how the method described herein allows better life-cycle management of cloud applications, because barriers introduced by a specific virtualization technology can be overcome through substitution.

Figure 15:
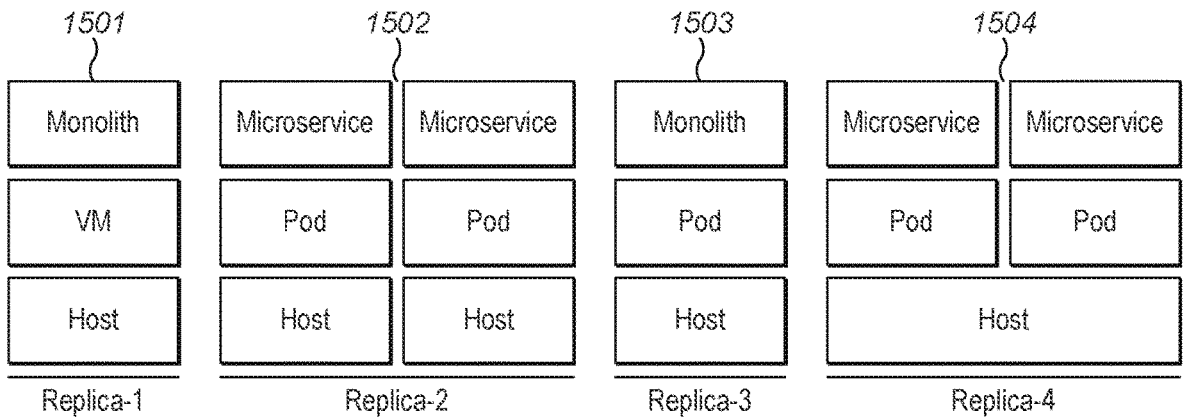
FIG. 15 illustrates another example of a deployment.

In addition, by way of another example, FIG. 15 illustrates that multiple replica instances of the same VNF can have different couplings. A VNF can have multiple instances requested at deployment time or may be scaled at runtime. Scaling a VNF in existing cloud platforms results in multiple copies of the same coupling.

However, in this case, in a first instance (Replica 1), as shown at 1501, the VNF is deployed as a monolith application implementation on a virtual machine virtualization technology on a host.

In a second instance (Replica 2), as shown at 1502, the VNF is deployed as a micro-services application implementation on a Pod virtualization technology, on two hosts.

In a third instance (Replica 3), as shown at 1503, the VNF is deployed as a monolith application implementation on a Pod virtualization technology.

In a fourth instance (Replica 4), as shown at 1504, the VNF is deployed as a micro-services application implementation on a Pod virtualization technology, on a single host.

Thus, the method described herein allows for a fine-grained control over optimization of infrastructure resource utilization, since the deployment units of the VNF can be tailored to the availability of the resources in the cloud platform.

Further, the service modelling will be simplified as the user will not need to model the application for a specific virtualization platform with the "preferred" software design. This will simplify service specification towards a true intent-based service deployment architecture.

There is thus described a method of deployment of a virtual network function application in a multi-technology virtualization environment, which in some embodiments has various advantages as described above.

There is also disclosed an orchestrator, suitable for performing the methods described above.

Figure 16:
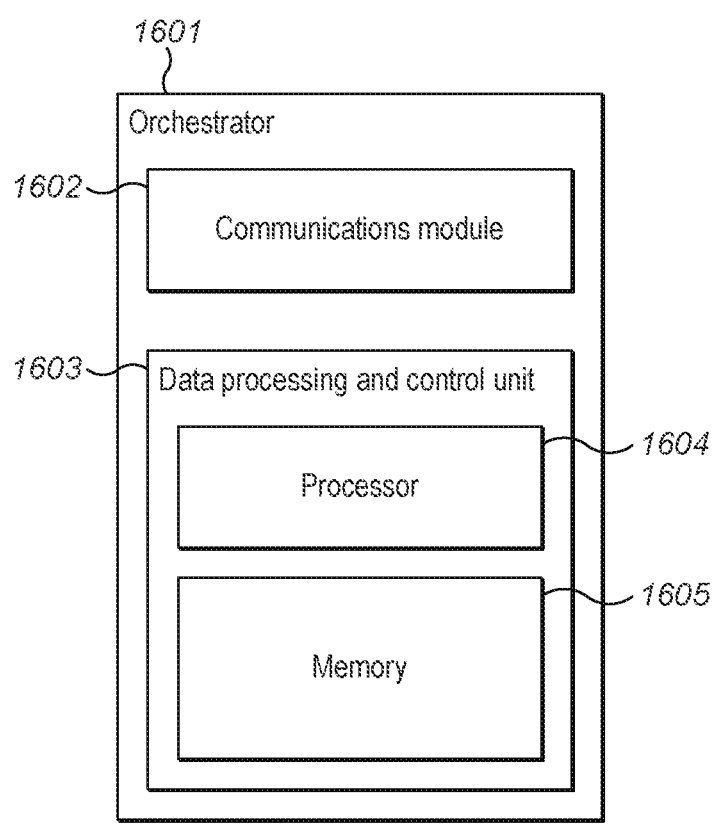
FIG. 16 is a schematic diagram of an illustrator for performing the methods described herein.

FIG. 16 illustrates the form of a suitable orchestrator 1601, which may for example be used as the orchestrator 405 in FIG. 4, the orchestrator 702 in FIG. 7, the orchestrator 1003 in FIG. 10, or the orchestrator 1202 in FIG. 12.

The orchestrator 1601 comprises a communications module 1602, for receiving information from other nodes, modules, and units. The orchestrator 1601 also comprises a data processing and control unit 1603, for performing the steps of the methods described herein. The data processing and control unit 1603 comprises a processor 1604, and a memory 1605. The memory 1605 may be configured to store data to be used by the processor 1604 in performing the relevant methods. The memory 1605 may also be used as a carrier for storing program instructions to be executed by the processor 1604, as described in more detail below.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the method described above in respect of FIG. 6.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of deployment of a virtual network function application in a multi-technology virtualization environment,
    wherein the multi-technology virtualization environment comprises a plurality of virtualization technologies,
    wherein the application exists in a plurality of application implementations, and
    wherein at least one of the virtualization technologies has a preferred one of said plurality of application implementations,
    the method comprising:
    receiving a trigger for a deployment of the virtual network function application; and
    in response to the received trigger, obtaining information about at least one optimization objective and about resource utilization in the multi-technology virtualization environment;
    and, based on the received information:
        selecting for said deployment one of said plurality of virtualization technologies;
        selecting one of said application implementations, wherein the selected application implementation need not be the preferred application implementation for the selected virtualization technology; and
        initiating the deployment of the selected application implementation of the virtual network function application on the selected one of the virtualization technologies.

2. The method of claim 1, wherein the application exists in one or more of: a monolith application implementation; a micro-services application implementation; and a Function as a Service application implementation.

3. The method of claim 1, wherein the multi-technology virtualization environment comprises a virtual machine virtualization technology.

4. The method of claim 3, wherein the application exists in one or more of: a monolith application implementation; a micro-services application implementation; and a Function as a Service application implementation, and wherein the preferred application implementation of the virtual machine virtualization technology is the monolith application implementation.

5. The method of claim 1, wherein the multi-technology virtualization environment comprises a container virtualization technology.

6. The method of claim 5, wherein the application exists in one or more of: a monolith application implementation; a micro-services application implementation; and a Function as a Service application implementation, and wherein the preferred application implementation of the container virtualization technology is the micro-services application implementation.

7. The method of claim 1, wherein the multi-technology virtualization environment comprises a serverless virtualization technology.

8. The method of claim 7, wherein the application exists in one or more of: a monolith application implementation; a micro-services application implementation; and a Function as a Service application implementation, and wherein the preferred application implementation of the serverless virtualization technology is the Function as a Service application implementation.

9. The method of claim 1, wherein the deployment trigger is received in response to a user request.

10. The method of claim 9, wherein the user request identifies the virtual network function application to be deployed.

11. The method of claim 10, wherein the user request includes configuration information.

12. The method of claim 11, wherein the configuration information relates to one or more of a capacity and a location of the deployment.

13. The method of claim 1, wherein the deployment trigger is received in response to a Life Cycle Management event.

14. The method of claim 13, wherein the Life Cycle Management event is a deployment update, scale, migrate, or rollback.

15. The method of claim 1, wherein selecting one of said plurality of virtualization technologies, based on information about resource utilization in the multi-technology virtualization environment, comprises using information about utilization of computational resources and/or of networking resources in the multi-technology virtualization environment.

16. The method of claim 1, wherein selecting one of said plurality of virtualization technologies, based on information about resource utilization in the multi-technology virtualization environment, comprises using predictions of future resource utilization in the multi-technology virtualization environment.

17. The method of claim 16, wherein the predictions of future resource utilization in the multi-technology virtualization environment are generated using machine learning.

18. The method of claim 1, wherein selecting one of said application implementations, based on information about resource utilization in the multi-technology virtualization environment, comprises using information about a potential relationship between at least one of said application implementations and software already running on the selected one of said plurality of virtualization technologies.

19. The method of claim 1, wherein selecting one of said application implementations, based on information about resource utilization in the multi-technology virtualization environment, comprises using predictions of future resource utilization in the multi-technology virtualization environment.

20. An orchestrator, configured for deploying a virtual network function application in a multi-technology virtualization environment,
   wherein the multi-technology virtualization environment comprises a plurality of virtualization technologies,
   wherein the application exists in a plurality of application implementations, and
   wherein at least one of the virtualization technologies has a preferred one of said plurality of application implementations,
   the orchestrator comprising a processor and a memory, the memory (containing instructions executable by the processor whereby the orchestrator is operative to:
      receive a trigger for a deployment of the virtual network function application; and
      in response to the received trigger, obtain information about at least one optimization objective and about resource utilization in the multi-technology virtualization environment; and, based on the received information:
      select for said deployment one of said plurality of virtualization technologies;
      select one of said application implementations, wherein the selected application implementation need not be the preferred application implementation for the selected virtualization technology;
      initiate the deployment of the selected application implementation of the virtual network function application on the selected one of the virtualization technologies.

\* \* \* \* \*